United States Patent [19]

Lacourse et al.

[11] Patent Number: 4,780,339

[45] Date of Patent: Oct. 25, 1988

[54] SIZED GLASS FIBERS AND METHOD FOR PRODUCTION THEREOF

[75] Inventors: Norman L. Lacourse, Plainsboro; Michael J. Hasuly, S. Plainfield; Paulo C. Trubiano, Somerville, all of N.J.

[73] Assignee: National Starch and Chemical Corporation, Bridgewater, N.J.

[21] Appl. No.: 133,223

[22] Filed: Dec. 8, 1987

Related U.S. Application Data

[63] Continuation of Ser. No. 892,024, Jul. 30, 1986, abandoned.

[51] Int. Cl.$^4$ .............................................. B05D 3/02
[52] U.S. Cl. .................................. 427/389.7; 427/384
[58] Field of Search .............................. 427/384, 389.7

[56] References Cited

U.S. PATENT DOCUMENTS

| | | | |
|---|---|---|---|
| 2,661,349 | 12/1953 | Caldwell et al. | 536/103 |
| 3,481,771 | 12/1969 | Doering | 117/126 |
| 3,682,685 | 8/1972 | Rex et al. | 106/210 |
| 3,746,558 | 7/1973 | Burkhout et al. | 106/213 |
| 3,793,065 | 2/1974 | Morrison et al. | 117/126 |
| 3,928,666 | 12/1975 | Morrison et al. | 428/378 |
| 4,168,345 | 9/1979 | de Massey et al. | 428/441 |

FOREIGN PATENT DOCUMENTS 932685  7/1963  United Kingdom .

OTHER PUBLICATIONS

U.S. Pat. Appln. Ser. No. 909,976 filed Sep. 22, 1986, M. J. Hasuly et al.

*Primary Examiner*—Thurman K. Page
*Assistant Examiner*—L. R. Horne
*Attorney, Agent, or Firm*—Royal N. Ronning, Jr.; Lori D. Tolly; Edwin M. Szala

[57] ABSTRACT

A method for sizing glass fibers upon formation is provided, employing a migration-resistant glass forming size composition which comprises an effective amount of a starch derivative having the formula

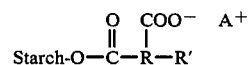

wherein R is dimethylene or trimethylene, R' is a $C_8$–$C_{18}$ alkyl or alkenyl group, and A is hydrogen or a monovalent cation.

16 Claims, No Drawings

SIZED GLASS FIBERS AND METHOD FOR PRODUCTION THEREOF

This is a continuation of application Ser. No. 892,024, filed July 30, 1986, now abandoned.

BACKGROUND OF THE INVENTION

The present invention relates to a method for preparing glass fibers and in particular to the application of a forming size to continuous filament glass fiber strand.

Glass fibers are produced by a means whereby a molten glass composition is flowed or pulled through tiny orifices or tips in a heated platinum bushing. The individual glass filaments are passed through a sizing bath, grouped into a strand and then wound on a rapidly rotating forming tube. A size is applied to the filaments in order to bond them together, maintain the integrity of the strand during winding and unwinding as well as facilitate eventual processing. The strand on the forming tube is thereafter placed in an oven to dry or is allowed to air dry to reduce the moisture content of the strand.

There are many different compositions which have been in use as glass forming sizes. Typically the sizes have comprised aqueous dispersions of various modified starches and oils. The following patents are directed to such compositions:

U.S. Pat. No. 3,227,192 (issued Jan. 4, 1966 to D. Griffiths) discloses an aqueous forming size containing an amylose starch mixture containing approximately equal portions of a high amylose starch component having an amylose content of about 50–60% and a low amylose starch component having an amylose content of about 20–30%.

U.S. Pat. No. 3,167,468 (issued Jan. 26, 1965 to J. Lovelace et al.) discloses an aqueous forming size containing a starch ether or ester which is the reaction product of starch and a tertiary or quaternary amine.

U.S. Pat. No. 3,481,771 (issued Dec. 2, 1969 to A. Doering) discloses an aqueous forming size dispersion having a low metallic ion content which employs an inhibited (crosslinked) or unhibited starch ether or ester derivative. Among the applicable starch esters listed are acetates, propionates, butyrates, laurates, stearates and oleates. Suitable crosslinking agents listed are aliphatic dihalides, ether forming epoxy halogen compounds (i.e., epichlorohydrin), polyfunctional reagents (i.e., phosphorus oxychloride), mixed anhydrides, and succinic anhydride.

U.S. Pat. No. 3,615,311 (issued Oct. 26, 1971 to R. Ignatius) discloses a forming size containing a cationic starch ether or ester and an underivatized starch that is preferably high in amylose.

U.S. Pat. Nos. 3,664,855 and 3,793,065 (issued May 23, 1972 and Feb. 19, 1974, respectively to A. Morrison et al.) employ starch ethers and esters of a substituted or unsubstituted monocyclic 5 or 6 member hydrocarbon ring in a glass forming size composition.

U.S. Pat. No. 3,928,666 (issued Dec. 23, 1975 to Morrison et al.) employs a starch ester of a 4–6 carbon isoalkanoic acid in a glass forming size composition.

U.S. Pat. No. 4,166,872 (issued Sept. 4, 1979 to R. Karpik et al.) is directed to a migration resistant forming size which contains a portion of swollen but unburst partially cooked starch granules preferably from a high amylose corn hybrid.

U.S. Pat. No. 4,168,345 (issued Sept. 18, 1979 to B. de Massey et al.) is directed to a glass forming size composition containing both a modified starch of low viscosity and an acrylic polymer film forming agent. The useful starch is modified by treatments including etherification, esterification, cationization or acid hydrolysis.

One problem addressed by many of the above patents is that of size migration, a phenomenon which occurs in the strand while it is wound on the forming tube. As the strand is dried, water moves from the interior of the forming tube to the exterior carrying with it some of the starch and oil of the size. The uneven deposition of starch on the fibers creates a number of problems in subsequent processing of the strands. As the strands are wound and unwound during various operations, tension of the strand should remain relatively constant. Uneven tension, created by non-uniform size distribution, causes individual glass filaments of the strand to become broken resulting in fuzzy strands which can clog fabrication equipment. Moreover, heat treatment of the fibers after fabrication, typically conducted at temperatures of about 650° C. in order to volatilize the size solids, results in uneven and unsatisfactory size removal. The residue remaining after thermal desizing will alter the dielectric properties of the fabricated piece and cause streaking or local discoloration.

The handling characteristics of sized glass fibers including the ability of the fibers to be processed at high speeds is related to the glass strand integrity. A glass strand with excellent strand integrity will exhibit a minimum number of broken filaments as well as minimum filament separation from the main strand after the winding and twisting processes subsequent to formation. In order to produce a glass strand having good strand integrity, a size formulation having good film forming properties is advantageously employed. While a high level of non-ionic oil in the glass size formulation is essential for lubrication during the formation operation, it is known to have a deleterious effect on the film formation of a starch size. As such, starch film integrity is usually sacrificed in order to provide for the economical production of the glass fiber.

The glass forming industry is still searching for means for providing sized glass fibers which exhibit minimal size migration and improved strand integrity.

Accordingly, it is an object of the present invention to provide an aqueous size which can be applied to glass fibers upon formation which will exhibit minimal size solids migration upon drying. It is also an object to provide an aqueous glass forming size which will provide good glass strand integrity.

None of the references mentioned above disclose or suggest the glass forming size compositions of the present invention.

SUMMARY OF THE INVENTION

The above and related objects are achieved by employing a glass forming size composition comprising an aqueous dispersion of a non-ionic oil and an effective amount of a starch derivative containing half-acid ester groups having the formula

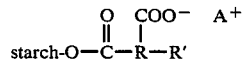

wherein R is dimethylene or trimethylene, R' is a $C_8$-$C_{18}$ alkyl or alkenyl group and A is hydrogen or a monovalent cation.

The aqueous glass forming size composition herein preferably comprises:

(a) from 1-12% of the half-acid ester starch derivative described above;
(b) from 0.5-8% of a non-ionic oil;
(c) from 0.05-2% of an emulsifier; and
(d) optionally 0-2% of a cationic lubricant.

The starch derivatives preferably employed herein are those of a high amylose corn starch base having an amylose content of about 50-70% which has been esterified with a $C_8$-$C_{14}$ alkenyl substituted succinic acid anhydride reagent.

By employing the starch derivative herein in the size composition, glass fibers sized with the composition upon formation are provided which exhibit improved migration resistance and/or improved glass strand integrity.

DESCRIPTION OF THE PREFERRED EMBODIMENTS

The starch half-acid esters useful in the present invention may be represented by the formula:

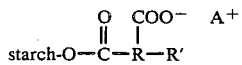

wherein R is dimethylene or trimethylene, R' is a $C_8$-$C_{18}$ alkyl or alkenyl group and A is hydrogen or a monovalent cation such as, for example, sodium or potassium. By employing the specific half acid esters of the prevent invention in a glass forming size composition, it has been discovered that improvements in migration resistance and/or film integrity properties are provided in comparison to a glass forming size composition which employs the same starch base without the $C_8$-$C_{18}$ alkyl or alkenyl half-acid ester substituent. While the $C_8$-$C_{18}$ substituent may contain some branching, it preferably comprises a linear hydrocarbon chain. The preferred starch derivatives are those of the above formula where R is dimethylene and R' is a $C_8$-$C_{14}$ alkyl or alkenyl group.

The applicable starch bases which may be used in the preparation of the half-acid esters include those typically used in glass forming size formulations such as those starches derived from corn, high amylose corn, potato, wheat, sago, rice, tapioca and arrowroot.

As described in U.S. Pat. No. 4,166,872 (discussed above), migration-resistant glass forming sizes are provided when partially cooked starches are employed in the formulation so that a majority of the starch is present in swollen, unburst granular form. The unburst granules are larger than the distance between wound glass filaments and, as such, aid in blocking the migration of soluble starch during drying. For this reason, we preferably employ as a starch base cook-resistant high amylose corn starch having an amylose content of about 50-70% or a starch base which has been inhibited (i.e., crosslinked) by conventional techniques in order to provide the starch granules with some thermal resistance to formulation and application temperatures. Useful crosslinking agents include, for example, epichlorohydrin and phosphorus oxychloride.

The starch bases may also advantageously be lightly converted by conventional acid, enzyme, or oxidation procedures. While minor amounts of conversion may provide the starch-containing sizes with improved migration resistance, it has been observed that too much conversion has a detrimental effect on migration. Suitable levels of inhibition and conversion, which will vary depending on the starch base and size formulation, may readily be determined by those knowledgeable in the art.

A suitable class of reagents for preparing the half-acid starch esters include substituted cyclic dicarboxylic acid anhydrides such as those described in U.S. Pat. No. 2,661,349 issued on Dec. 1, 1953 to Caldwell et al., having the structure

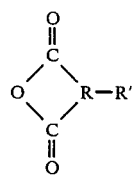

where R is dimethylene or trimethylene and R' is a $C_8$-$C_{18}$ alkyl or alkenyl group. The substituted cyclic dicarboxylic acid anhydrides falling within the above structural formula are the substituted succinic and glutaric acid anhydrides. One may also use the substituted dicarboxylic acid chlorides of those dicarboxylic acids which form cyclic anhydrides. The free carboxyl group on the starch molecule results from the esterification of only one carboxyl group of the dicarboxyl acid.

The starch esterification reaction may be conducted by a number of techniques known in the art and discussed in the literature employing, for example, an aqueous reaction medium, an organic solvent medium, or a dry heat reaction technique. For a discussion of such techniques see R. L. Whistler, Methods in Carbohydrate Chemistry, Vol. IV, 1964, pp. 279-311; R. L. Whistler et al., Starch: Chemistry and Tehcnology, Second Edition, 1984, pp. 311-366; and R. Davidson and N. Sittig, Water-Soluble Resins, 2nd Ed., 1968, Chapter 2.

When employing the cyclic dicarboxylic acid anhydride reagents, starch is preferably treated in granular form with the reagents in an aqueous alkali medium at a pH not lower than 7 nor higher than 11. This may be accomplished by suspending the starch in water, to which has been added (either before or after addition of the starch) sufficient base such as alkali metal hydroxide, alkaline earth hydroxide, quaternary ammonium hydroxide, or the like, to maintain the mixture in an alkaline state during the reaction. The required amount of the reagent is then added, agitation being maintained until the desired reaction is complete. Heat may be applied, if desired, in order to speed the reaction; however, if heat is used, temperatures of less than about 45° C. should be maintained. In a preferred method, the alkali and the anhydride reagent are added concurrently to the starch slurry, regulating the rate of flow of each of these materials so that the pH of the slurry remains preferably between 8 and 11.

Due to the greater hydrophobic nature of certain of the substituted cyclic dicarboxylic acid anhydride reagents useful herein (i.e., those having $C_{10}$ or higher substituents), the reagents react with starch in only minor amounts in standard aqueous reactions. In order to improve the starch reaction efficiency, starch is reacted with the hydrophobic reagent under standard aqueous conditions in the presence of at least 5%, preferably 7-15% (based on the weight of the reagent), of a phase transfer agent. Suitable phase transfer agents include organic quaternary salts (trioctylmethyl ammonium chloride and tricaprylylmethyl ammonium chloride being prefered), tertiary amines, and polyalkylene oxide ethers or esters.

The proportion of reagent used will vary with the particular reagent chosen (since they naturally vary in reactivity and reaction efficiency), and the degree of substitution desired. Thus, substantial improvements in sizing have been achieved by using a starch derivative made with 2% of the reagent, based on the weight of the starch. Preferred treatment levels are on the order of about 2 to 10% reagent.

The aqueous size composition of the present invention will typically have a solids content of about 2-20% by weight wherein the half-acid ester starch derivative is present in an amount ranging from about 1-12% and preferably 2-6% of the total size composition. Preferably the size composition contains on the order of about 2-10% solids. The total solids should be at a level whereby the viscosity of the size dispersion is acceptable for application to the glass filaments, i.e., not exceeding 100 centipoise at 40°-50° C.

The non-ionic oils useful in the fiber size composition may be selected from vegetable, animal, or mineral oils, and are preferably hydrogenated to reduce their flowability. The oils are preferably fatty triglycerides including, for example, hydrogenated soybean oil, hydrogenated corn oil, glycerol tristerate, hydrogenated glycerol trioleate, and the like. The oil will typically be present in the size formulation in amounts ranging from about 0.5-8.0% of the total composition and is preferably employed in an amount ranging from 25 to 75%, based on the total starch concentration.

The size composition also preferably contains an emulsifying agent, typically present in amounts ranging from about 0.05-2.0% of the total size composition. HLB values between about 3 to 16 are most suitable with polyoxyalkylenesorbitans being preferred. Such emulsifiers are commercially available and include TWEEN 81® from ICI Americas, Inc. which is a polyethylene derivative of sorbitan monooleate. TRITON® emulsifiers, polyoxyethylene derivatives of alkyl-substituted phenols, obtained from Rohm and Haas are also useful herein.

Cationic glass fiber lubricants used in the art to serve primarily as a lubricant prior to the time the sized fibers are dried may optionally be employed in the present composition in an amount less than about 2% of the total size composition. Such lubricants include for example alkyl imidazoline derivatives (i.e., the reaction product of tetraethylene pentamine and stearic acid) and quaternary pyridinium compounds.

Other conventional glass forming size additives including, for example, solid unctuous materials such as wax, fat, or gelled oils which do not flow at application temperatures; secondary film formers such as gelatin, polyvinyl alcohol, and polyacrylates; silane coupling agents; mildew preventatives; and fungicides may also be employed in the present composition in conventional amounts.

The size compositions herein may be prepared and applied to the glass fibers upon formation by conventional means. An aqueous slurry of the starch derivative is preferably cooked for a period of time to gelatinize a portion of the starch while maintaining a quantity (at least 20% and preferably at least 50%) of the starch in swollen, unburst granular form. Thereafter an emulsion of the non-ionic oil and emulsifier is typically added to the starch slurry along with any additional size ingredients prior to application. The size composition may then be applied at an elevated temperature (typically 55°-65° C.) by a suitable application method such as by the employment of an apron type applicator or other conventional means including a padder or roll apparatus, an immersion apparatus or by spray or jet means, all of which are well known to those skilled in the art.

In the examples which follow, all parts and percentages are given by weight and all temperatures are in degrees Celsius.

The size migration of the sizes herein was quantitatively evaluated in duplicate employing the following test procedure:

In this procedure, a 27 cm.×45 cm. piece of a fiberglass fabric of 22×16 ends per inch (56×41 ends per cm.) construction is saturated with the size dispersion (at 140° F., 60° C.) then run through a laboratory padder (manufactured by L&W Machine Works of Rock Hill, S.C.) for extraction at a pressure setting of 20 at 30 rpm. The sized fiberglass is then wrapped around a 4 cm. diameter glass cylinder, placed in a horizontal position and air dried for 16 hours. The dried fabric is thereafter cut in 15 squares of 9 cm.×9 cm. each. These sammples are subjected to a temperature of 1,200° F. (649° C.) for a period of one hour whereupon the resulting fabric is weighed to determine the amount of size which is burned off. The migration coefficient of the size is determined to be the slope of the line representing the weight of size volatilized versus the position of the fabric from the inner most wound edge. It can be calculated by the following formula:

$$M = \frac{\sum_{1}^{n} XY(1/n) - XY}{(\sigma X)^2}$$

where M is the migration coefficient, X is the distance from the inner edge, Y is the weight of volatilized size, $\sigma X$ is the standard deviation of X, and n is the number of samples. It is understood that poorer migration results in higher migration coefficient values.

In order to observe trends in the film integrity of a series of similar size formulations, a film of each size was cast on a glass plate with a 20 mil Bird Applicator. The films were air dried and then qualitatively compared with each other for film formation. If a size exhibited no film formation, it was given a rating of 0. Samples which exhibited some film forming ability were given a rating between 1 and 10 with a higher rating indicating better film formation.

EXAMPLE 1

This example illustrates a laboratory procedure for preparing a half-acid starch succinate derivative useful herein. The starch base is used in glass forming sizes of the prior art.

About 100 parts high amylose corn starch having an amylose content of about 50% (Sample A) was slurried in 150 parts water at room temperature. The pH of the slurry was adjusted to 7.5 by the addition of dilute sodium hydroxide (3%). A total of 3 parts octenyl succinic acid anhydride (OSAA) reagent was added slowly to the agitated starch slurry with the pH maintained at 7.5 by the metered addition of the dilute sodium hydroxide. After the reaction was complete, the pH was adjusted to about 5.5 with dilute hydrochloric acid (3:1). The starch (Sample B) was thereafter recovered by filtration, washed three times with water and air dried. Starches prepared as above typically have a carboxyl content of about 4.3%.

EXAMPLE 2

A fluidity high amylose starch was prepared then reacted with OSAA according to the following procedure:

About 100 parts high amylose corn starch having an amylose content of about 50% was slurried in about 150 parts water followed by the addition of 1 part of reagent-grade, concentrated hydrochloric acid (37%). The temperature of the slurry was raised to 125° F. (52° C.) and the mixture was allowed to react with constant stirring for 16 hours. Thereafter, the pH of the hydrolyzed starch slurry was adjusted to 4.5 with sodium carbonate. After cooling to room temperature, the starch slurry was adjusted to pH 7.5 and reacted with 3 parts OSAA as in Example 1. Sample C was thereafter recovered.

EXAMPLE 3

Sample D was prepared as in Example 2 with the exception that 3 parts of hydrochloric acid were employed resulting in a more converted product having a calcium chloride water fluidity of 38. The fluidity measurement was determined according to the procedure detailed in U.S. Pat. No. 4,228,199 (issued Oct. 14, 1980 to C. W. Chiu et al.) with the exception that 100 g. of 20% calcium chloride solution is used in place of the 100 g. water and a stainless steel cup is used in place of the copper cup.

EXAMPLE 4

An acid converted and inhibited potato starch (Sample E) which has been employed in glass forming size compositions was derivatized with 3% of OSAA according to the procedure of Example 1. The product recovered was designated Sample F.

EXAMPLE 5

An unhydrolyzed high amylose corn starch having an amylose content of about 50% was reacted with 2% tetradecenylsuccinic acid anhydride (TDSAA) as described in Example 1 in the presence of 0.007 parts (based on starch solids) of tricaprylylmethyl ammonium chloride phase transfer agent at a pH of 8. Sample G was recovered by filtration.

Sample H was prepared as above employing 10% TDSAA.

EXAMPLE 6

This example illustrates the improvements in film integrity exhibited by sizes employing the half-acid starch esters herein.

The following ingredients were employed:

| Starch Sample | 3.4 parts |
| Partially hydrogenated Soybean Oil | 1.7 parts |
| Tween 81 ® | 0.2 parts |
| Water | 94.7 parts |

A forming size composition was prepared as follows:

Two parts of distilled water and the emulsifier were heated to 140° F. (60° C.). The mixture was then added to the soybean oil at room temperature. An emulsion was formed by employing a Waring blender.

In a separate container, the starch and 71.8 parts distilled water were slurried. The slurry was then placed in a boiling water bath for 10 minutes prior to being transferred to a pressure cooker whereupon cooking continued under 5 pounds pressure for 30 minutes at 108° C. With minor agitation (100 rpm) the cooked dispersion was diluted with twenty parts of cold distilled water and allowed to cool to 140° F. (60° C.). Thereafter, the soybean oil emulsion was added.

The size formulation was mixed for 5 minutes then applied to pieces of fiberglass fabric as described above. Migration results and film integrity evaluations for the samples may be found in Table I.

TABLE I

| Starch Sample in Size Formulation | Starch* Treatment | Film Integrity | Migration Coefficient |
|---|---|---|---|
| A (Control) | None | 0 | .17 |
| B | 3% OSAA | 6 | .18 |
| C | 1% HCl, 3% OSAA | 9 | .17 |
| D | 3% HCl, 3% OSAA | 4 | .38 |

*high amylose (~50%) corn starch

The results show that Starch Sample B containing the $C_8$ alkenyl succinate substituent and fluidity Starch Sample C containing the same substituent provided significant improvements in film integrity over the control while the amount of migration remained constant. The more converted half-acid ester Sample D was seen to provide some film integrity, however the migration of the size was seen to increase dramatically.

EXAMPLE 7

Size formulations prepared as in Example 6, employing potato starch Samples E and F of Example 4, were evaluated for migration and film integrity. The results may be found in Table II.

TABLE II

| Starch Sample in Size Formulation | Starch* Treatment | Migration Coefficient | Film Integrity |
|---|---|---|---|
| E (Control) | None | .38 | 8 |
| F | 3% OSAA | .32 | 3 |

*National 1554, an acid converted and epichlorohydrin - inhibited potato starch obtainable from National Starch and Chemical Corporation.

The results show that the potato starch sample F containing the $C_8$ alkenyl succinate substituent provided the size composition with improved migration resistance over the control while still providing some film integrity.

EXAMPLE 8

Size formulations prepared as in Example 6, employing the tetradecenyl starch succinates of Example 5 were evaluated for migration and film integrity. The results may be found in Table III.

TABLE III

| Starch Sample in Size Formulation | Starch* Treatment | Migration Coefficient | Film Integrity |
|---|---|---|---|
| A (Control) | None | .17 | 0 |
| G | 2% TDSAA | .14 | 0 |
| H | 10% TDSAA | .11 | 2 |

*high amylose (~50%) corn starch

The results show that in comparison to the control, the $C_{14}$ alkenyl starch succinate Samples G and H reduced migration significantly. Sample H was also seen to provide some improvement to film integrity.

In summary, a glass forming size composition is provided which advantageously employs a starch derivative containing a $C_8$–$C_{18}$ alkyl or alkenyl half-acid ester substituent. By employing the specific starch derivatives described herein, glass forming size compositions are provided which exhibit improved migration resistance and/or improved film integrity in comparison to a size composition which contains a similar amount of a starch base which does not contain the particular half-acid ester substituent. An improved method for sizing glass fibers upon formation employing the present size composition and the sized fibers prepared therefrom are also provided.

Variations and alterations may be made in the invention without departing from the spirit and scope of the invention as defined by the following claims.

We claim:

1. An improved method for the sizing of glass fibers comprising forming said fibers in the presence of a glass forming size composition having a solids content of 2–20% by weight which comprises an aqueous dispersion of a starch and a non-ionic oil, wherein the improvement comprises employing an effective amount of a starch derivative in said aqueous dispersion, wherein said size comprises (a) about 1–12% by weight of a half-acid ester starch derivative having the formula

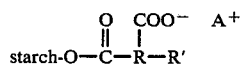

wherein R is dimethylene or trimethylene, wherein R' is a $C_8$–$C_{18}$ alkyl or alkenyl group, and A is a hydrogen or a monovalent cation;
    (b) about 0.5–8% by weight of a non-ionic oil;
    (c) about 0–2% by weight of a cationic lubricant.

2. The method of claim 1, wherein R is dimethylene.

3. The method of claim 2, wherein R' is the $C_8$–$C_{14}$ alkyl or alkenyl group.

4. The method of claim 1, wherein the starch derivative is the derivative of a high amylose corn starch having an amylose content of about 50–70% amylose.

5. The method of claim 1, wherein the starch derivative is the derivative of a converted, inhibited potato starch.

6. The method of claim 1, wherein 2–6% of the starch derivative is present in the size composition and the non-ionic oil is present in an amount ranging from about 25–75% based on the starch concentration.

7. The method of claim 6, wherein the non-ionic oil is selected from the group consisting of a vegetable, animal, and mineral oil.

8. The sized glass fiber produced according to the method of claim 1.

9. A glass forming size composition which exhibits improved migration resistance and produces sized glass fibers having improved migration resistance and/or improved glass strand integrity comprising and aqueous dispersion having a solids content of 2–20% by weight and comprising (a) about 1–12% by weight of a half-acid ester starch derivative having the formula

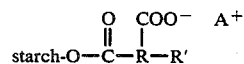

wherein R is dimethylene or trimethylene, R' is a $C_8$–$C_{18}$ alkyl or alkenyl group, and A is a hydrogen or a monavalent cation;
    (b) about 0.5–8% by weight of a non-ionic oil;
    (c) about 0.005–2% by weight of an emulsifier; and
    (d) about 0–2% by weight of a cationic lubricant.

10. The size composition of claim 9 characterized in that at least 20% of the starch derivative is present in a swollen, unburst granular form.

11. The size composition of claim 10, wherein R of the starch derivative is dimethylene and R' is the $C_8$–$C_{14}$ alkyl or alkenyl group.

12. The size composition of claim 11, wherein the starch derivative is the derivative of a high amylose corn starch having an amylose content of about 50–70% amylose.

13. The size composition of claim 11, wherein the starch derivative is the derivative of a converted, inhibited potato starch.

14. The size composition of claim 11, wherein the starch derivative is an esterification product of a starch and octenyl succinic acid anhydride.

15. The size composition of claim 11, wherein the starch derivative is an esterification product of a starch and tetradecenyl succinic acid anhydride.

16. The size composition of claim 9, wherein 2–6% of the starch derivative is present in the composition and the non-ionic oil is present in an amount ranging from about 25–75%, based on the starch concentration.

* * * * *